(12) United States Patent
Morrison

(10) Patent No.: US 9,823,379 B2
(45) Date of Patent: Nov. 21, 2017

(54) SYSTEM AND METHOD FOR MAPPING DEEP ANOMALOUS ZONES OF ELECTRICAL RESISTIVITY

(71) Applicant: GroundMetrics, Inc., San Diego, CA (US)

(72) Inventor: H. Frank Morrison, Berkeley, CA (US)

(73) Assignee: GroundMetrics, Inc., San Diego, CA (US)

( * ) Notice: Subject to any disclaimer, the term of this patent is extended or adjusted under 35 U.S.C. 154(b) by 0 days.

(21) Appl. No.: 15/119,064

(22) PCT Filed: Feb. 13, 2015

(86) PCT No.: PCT/US2015/015805
§ 371 (c)(1),
(2) Date: Aug. 15, 2016

(87) PCT Pub. No.: WO2015/123515
PCT Pub. Date: Aug. 20, 2015

(65) Prior Publication Data
US 2017/0059737 A1    Mar. 2, 2017

Related U.S. Application Data

(60) Provisional application No. 61/965,985, filed on Feb. 13, 2014.

(51) Int. Cl.
*G01V 3/00*    (2006.01)
*G01V 3/02*    (2006.01)
(Continued)

(52) U.S. Cl.
CPC .............. *G01V 3/20* (2013.01); *E21B 17/003* (2013.01); *E21B 47/122* (2013.01); *E21B 49/00* (2013.01)

(58) Field of Classification Search
CPC ........................................................ G01V 3/24
(Continued)

(56) References Cited

U.S. PATENT DOCUMENTS 3,876,471 A *   4/1975 Jones .............................. 175/93
4,374,164 A *   2/1983 Blank ........................ 427/385.5
(Continued)

FOREIGN PATENT DOCUMENTS

WO    WO 2012/177349    12/2012
WO    WO 2014/039618    3/2014

OTHER PUBLICATIONS

Schenkel, C. J. and Morrison, H. F., 1990, Effects of Well Casing on Potential Field Measurements using Downhole Current Sources: Geophys. Prosp., 38, No. 6, 663-686.
(Continued)

*Primary Examiner* — Bot Ledynh
(74) *Attorney, Agent, or Firm* — Diedericks & Whitelaw, PLC

(57) ABSTRACT

A system and method are provided for delivering current to a lower exposed end of a well in which a source of current is connected to a middle section of a well casing or tubing inserted in the casing with the middle section being electrically isolated from a first or upper section by an insulative coupler and treated to be electrically resistive. A cable is attached to the middle section and used to deliver current along the wall of the middle section to the lower exposed end such that the lower exposed end is used to generate an electric field in nearby geological zones. Changes in the generated electric field resulting from the nature of materials in the geological zones can be detected by surface or below ground monitors or sensors.

24 Claims, 4 Drawing Sheets

(51) Int. Cl.
    *G01V 3/24*     (2006.01)
    *G01V 3/20*     (2006.01)
    *E21B 47/12*    (2012.01)
    *E21B 17/00*    (2006.01)
    *E21B 49/00*    (2006.01)

(58) Field of Classification Search
    USPC .......................................................... 324/355
    See application file for complete search history.

(56) References Cited

U.S. PATENT DOCUMENTS

| | | | |
|---|---|---|---|
| 4,825,165 A | | 4/1989 | Helms et al. |
| 5,209,804 A | * | 5/1993 | Trudeau .................... 156/364 |
| 5,261,993 A | * | 11/1993 | Dahlgren .................... 156/382 |
| 5,747,750 A | | 5/1998 | Bailey et al. |
| 6,515,592 B1 | * | 2/2003 | Babour et al. ............. 340/854.4 |
| 6,818,686 B1 | * | 11/2004 | Colpaert et al. ............... 524/17 |
| 6,826,486 B1 | | 11/2004 | Malinverno |
| 7,798,214 B2 | * | 9/2010 | Schmitt et al. ........... 166/250.01 |
| 2003/0083443 A1 | * | 5/2003 | Santobianco et al. ........ 525/530 |
| 2007/0278008 A1 | | 12/2007 | Kuckes et al. |
| 2008/0259727 A1 | | 10/2008 | Drew |
| 2010/0259267 A1 | * | 10/2010 | Rosthal et al. ............... 324/339 |
| 2011/0178194 A1 | * | 7/2011 | Jo et al. ........................... 521/91 |
| 2011/0315378 A1 | | 12/2011 | Homan et al. |
| 2012/0153217 A1 | * | 6/2012 | Saga ............................... 252/75 |
| 2012/0158309 A1 | | 6/2012 | Alshakhs |
| 2014/0216734 A1 | * | 8/2014 | Hupp ......................... 166/255.1 |
| 2015/0061684 A1 | * | 3/2015 | Marsala et al. ............... 324/355 |

OTHER PUBLICATIONS

Schenkel, C. J. and Morrison, H. F., 1994, Electrical Resistivity Measurement Through Metal Casing: Geophysics, 59, No. 7, 1072-1082.
www.bondcoat.com.
http://www.tenaris.com/en/Products/OffshoreLinePipe/Coating/ExternalAnticorrosion.aspx.
www.libertycoating.com.
www.zonge.com.

* cited by examiner

SYSTEM AND METHOD FOR MAPPING DEEP ANOMALOUS ZONES OF ELECTRICAL RESISTIVITY

CROSS-REFERENCE TO RELATED APPLICATIONS

The present application represents a National Stage application of PCT/US2015/015805 entitled "System and Method for Mapping Deep Anomalous Zones of Electrical Resistivity", filed Feb. 13, 2015, pending, which claims the benefit of U.S. Provisional Application Ser. No. 61/965,985 entitled "Electric Current Based Device and Method for Mapping Deep Anomalous Zones of Electrical Resistivity" filed Feb. 13, 2014.

BACKGROUND OF THE INVENTION

This invention relates to a multi-component system and method for deep well mapping of zones of anomalous electrical resistivity. More particularly, the invention utilizes currently employed coated, corrosion resistant well casings to carry an electric current down to an exposed end of the production tubing portion at depth whereby the strength of the transmitted current is sufficient to generate electric fields. The effect on these fields in anomalous zones proximate the end of the well is a function of the nature of the materials in the zone, which effects can be monitored by appropriately placed sensors.

Electric and electromagnetic geophysical methods are used to map the distribution of electrical resistivity in the subsurface of the earth. Generally known methods employ transmitters that induce electrical currents to flow in the ground. The transmitters can be sources of electric current injected by electrodes implanted in the soil or rock and connected to a power supply or the transmitters can be loops of wire carrying an alternating current which produces an alternating magnetic field that, by Faraday's law of induction, induces an electromotive force in the ground that, in turn, drives currents in the ground. In either case, the currents induced depend on the distribution of resistivity in the ground and these induced currents produce secondary electric and magnetic fields that can be measured by receivers which are usually separated from the transmitter. For instance, the receivers may include two separated electrodes in contact with the ground and across which a voltage is measured that is proportional to the electric field at that point. Receivers may also include a variety of sensors designed to measure the magnetic fields that accompany the induced currents. The transmitters and receivers can be on the surface or in the ground.

These methods can be used to determine the distribution of electrical resistivity in the ground. For example, the methods can be used to characterize the layering of the ground so as to identify a resistive layer that contains oil or gas, a conductive layer containing saline water, or a clay layer that might be an impermeable barrier for hot water in a geothermal setting, or the like. A more specific application of such methods is to determine the size and electrical resistivity of limited regions in the ground. Examples are zones of petroleum rich rock in an oilfield that has not been drained by the existing oil wells in the field (essentially bypassed oil), zones of electrically conducting rocks reflecting the presence of metallic ore minerals, a zone of enhanced conductivity brought about by the injection under pressure of a fluid mixture designed to cause a fracture or a fluid mixed with solid conductive particles intended to keep the fracture open (proppant), or a zone of decreased resistivity caused by the injection of carbon dioxide for sequestration for mapping and monitoring steam or chemicals injected to reduce viscosity and increase production from an oilfield formation. In all of these applications, the goal is to detect and, if possible, delineate a zone whose electrical resistivity is distinctly different from the resistivity of the overall volume of the ground below the surface in a specified region (referred to as the background resistivity).

A specific, known transmitter-receiver configuration that is particularly effective for detecting and delineating finite zones with a resistivity different from the background resistivity is an electric current source in which at least one of the electrodes is located at depth in the vicinity of the target zone. This configuration is shown in FIG. 1. This traditional surface-based configuration employs two current electrodes on the surface, A-B, that inject current I into the ground. Collectively this structure is usually referred to as the transmitter. Current is carried to each electrode from a power supply (not shown) by an insulated cable. Another pair of two separated electrodes on the surface, usually referred to as a dipole, is used to measure the voltage drop V between two points caused by the injected currents. This measuring dipole is usually referred to as the receiver. The measurement is usually described in terms of an electric field, in volts per meter, obtained by simply dividing the measured voltage by the separation distance L of the electrodes. The receiver dipole usually occupies successive positions on the surface over the target zone. A variant on this configuration, to which this invention is directed, uses a deep electrode B' to inject the current adjacent to the anomalous zone being investigated.

In either case, the current in the ground is distorted by the presence of the anomalous zone. In the situation where the anomalous zone is less resistive than the surroundings, current is deflected or channeled into the zone and the resulting secondary fields, seen at some distance away such as in a nearby borehole or on the surface, can be represented by an induced current dipole in the zone whose strength is proportional to the size of the anomalous zone and the difference in resistivity. The electric fields measured along the surface are perturbed or offset from the value they would have in the absence of the anomalous zone. The fields on the surface are thus composed of the fields that would be present for the background in the absence of the anomalous zone, plus the secondary or anomalous fields caused by anomalous currents caused by the zone of anomalous resistivity. The measurement of the anomalous fields on the surface permits the determination of the depth, size and resistivity contrast of the particular target zone.

The perturbation in surface electric fields caused by a small zone is itself small and difficult to recognize in practical field data because normal surface field variations due to inhomogeneities in the background, and particularly due to near surface resistivity inhomogeneities, dwarf the anomalies of deep features. However, the goal of many electrical surveys is to detect changes in the zone of interest over time scales appropriate to the subsurface activity. The background resistivity can be assumed invariant over these scales and so small changes in resistivity in small zones at depth can be detected.

The importance of placing an electrode at the depth of the anomalous zone is shown quantitatively in FIG. 2. The target zone for this illustrative model is a vertical, 100 meter by 200 meter conductive sheet 202 which is oriented in the vertical or x-z plane, while both the transmitter and receiver are on the x axis. The sheet is characterized by the product of its conductivity and thickness (in this model the conductivity thickness product is 10 (note: conductivity is the reciprocal or inverse of resistivity and the units can be Siemens, S, per meter; the conductivity thickness is therefore in Siemens). The background resistivity in this example is 100 Ohm meters ($\rho$=100 $\Omega$m). The secondary surface electric fields, Ex, are plotted as a function of distance from the well in FIG. 2B for two source current configurations: a surface bipole A-B, and an inverted L-shaped array A'-B' with the B' current electrode in the vicinity of the target.

The surface field anomaly from this deeply buried conductive zone is 100 times larger than that produced from the surface array when one of the electrodes is buried. The results in this figure are presented for surface electric fields in Volts per meter (V/m) for a source current of one Ampere (A). In a typical survey, a current of 10 A would be used and the voltage difference between two measuring points 100 m apart would be measured. The voltage measured in the model study shown would therefore be 1000 times the field values in the plot. For example, at a distance of 300 m from the well-head using the deep electrode, the secondary field is $10^{-8}$ Volts per meter so the voltage difference on a receiving dipole would be $10^{-5}$ Volts and easily measured. With this in mind, it becomes clear that a whole new window on subsurface features is opened if the current source can be located close to the desired zone of investigation.

The problem that has kept this deep source configuration from being implemented is that there has been no practical method of placing a current electrode with its attendant insulated current cable at the bottom of a typical drilled well. Almost all wells drilled for hydrocarbons, geothermal fluids or steam, carbon dioxide injection, water etc. are lined with a metallic pipe called a casing. A normal casing plan for a well involves successive casings of varying lengths and progressively smaller diameter. A large diameter hole is drilled through the near surface, usually unconsolidated, formations. A reduced diameter hole is then drilled and cased to greater depth and, finally, an even smaller diameter hole is drilled and cased to the desired maximum depth. The last, smallest diameter casing is referred to as the production casing. In some situations, a continuous length of tubing, referred to as the production tubing, is inserted inside the production casing. At each stage, cement is forced into the annular space between the drilled hole and the casing, with the cement filling the space for a short distance between the casings from the bottom of the larger casing. The space between the innermost casing and the next largest diameter casing in the upper portion of the well is empty. Most important, there needs to be continuous free access to the production casing. However, equipment devices called packers, which seal off certain depths in the well and tubing used to withdraw or inject fluids, occupy the production casing such that there is no room for a heavy current carrying cable or electrode.

With the above in mind, there is seen to be a need for a system and method which will enable a current electrode to be effectively provided at the bottom of a drilled well in order to enhance the ability to map subsurface zones of anomalous electrical resistivity.

SUMMARY OF THE INVENTION

The present invention is directed to a system and method for delivering current to a bottom section of a well. More specifically, a source of current is connected to a middle segment of a well casing or a tubing inserted into the well casing (herein generically referred to as a "well conduit"). The middle segment is electrically isolated from a first segment, and is formed or treated, such as by applying an outer coating of an electrically resistive (and perhaps also corrosion resistant) material, oxidizing the outer portion thereof, or the like, so as to be electrically resistive. With this arrangement, sufficient current is transported along and inner wall portion of the middle segment to an uncoated end section to generate an electric field at the bottom section of the well. Changes in the generated electric field resulting from the nature of materials in the ground in surrounding zones can then be detected by surface or below ground monitors or sensors, with the measured results being used for the detection and delineation of subsurface features.

According to certain embodiments of the invention, the segments form a production casing and, in at least one other embodiment, the segments form part of a tube inserted into an existing well casing. In either case, a lowermost segment (or segments) is left bare at the bottom of the well and a current source is connected to the intermediate or middle segment, below an uppermost segment which is electrically isolated from the intermediate segment, such by an insulative coupler, such that the current will flow through the intermediate segment to reach the bare metal segment at the bottom of the well. The outer, insulating layer prevents current from 'leaking' off or dissipating from the outer portion intermediate segment into surrounding casings or the ground. With this arrangement, current can now be transmitted to the end of the casing without interfering with any equipment or operations within the intermediate segment during well production or operation.

Additional objects, features and advantages of the invention will become more readily apparent from the following detailed description when taken in conjunction with the drawings.

BRIEF DESCRIPTION OF THE DRAWINGS

The present invention is described with respect to particular exemplary embodiments thereof and reference is accordingly made to the drawings in which.

DETAILED DESCRIPTION OF THE INVENTION

Figure 1:
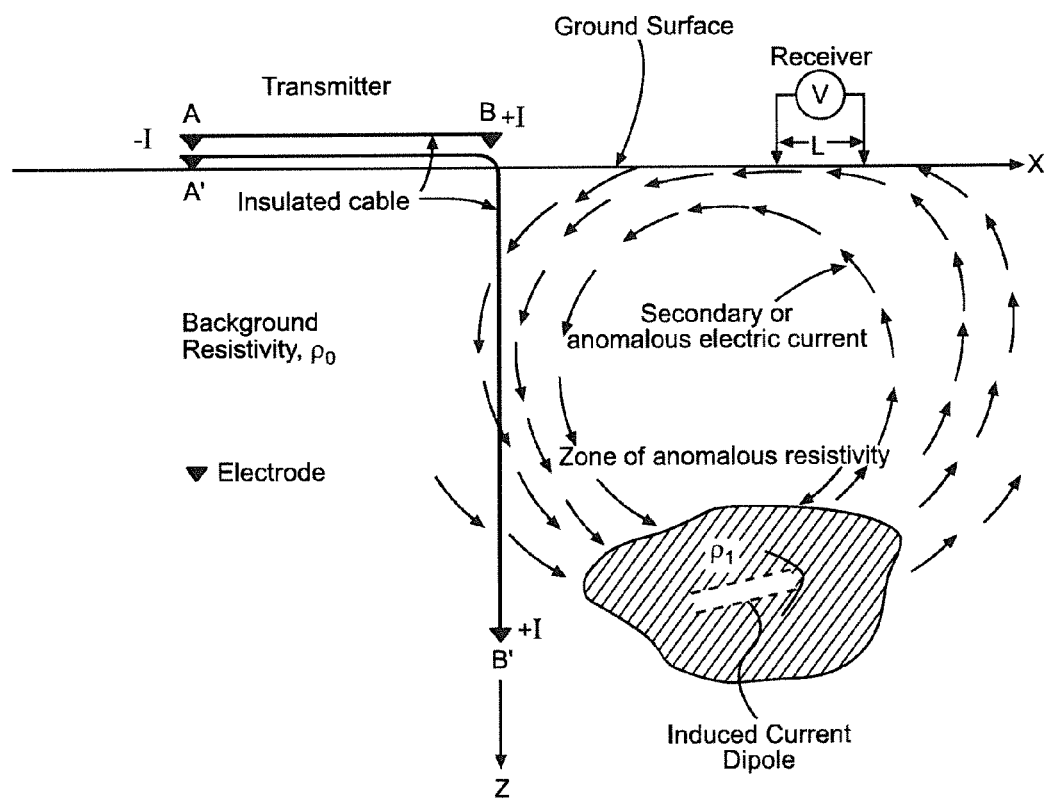
FIG. 1 is a schematic illustration of a prior art method for current mapping of anomalous underground zones.
Figure 2A:
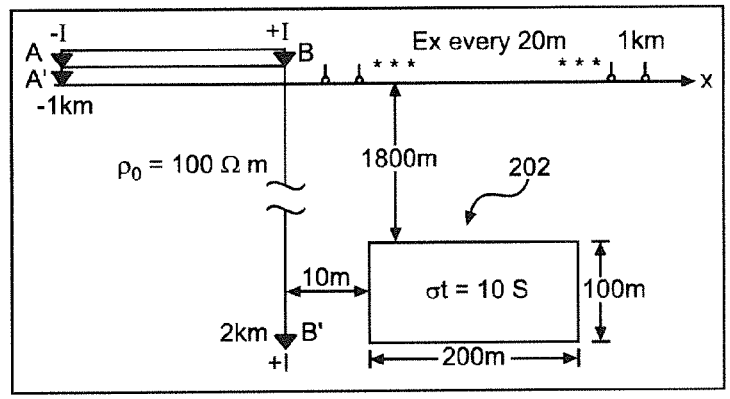
FIG. 2A is a schematic representation of a vertical fracture zone used here to represent a typical zone of anomalous resistivity.
Figure 2B:
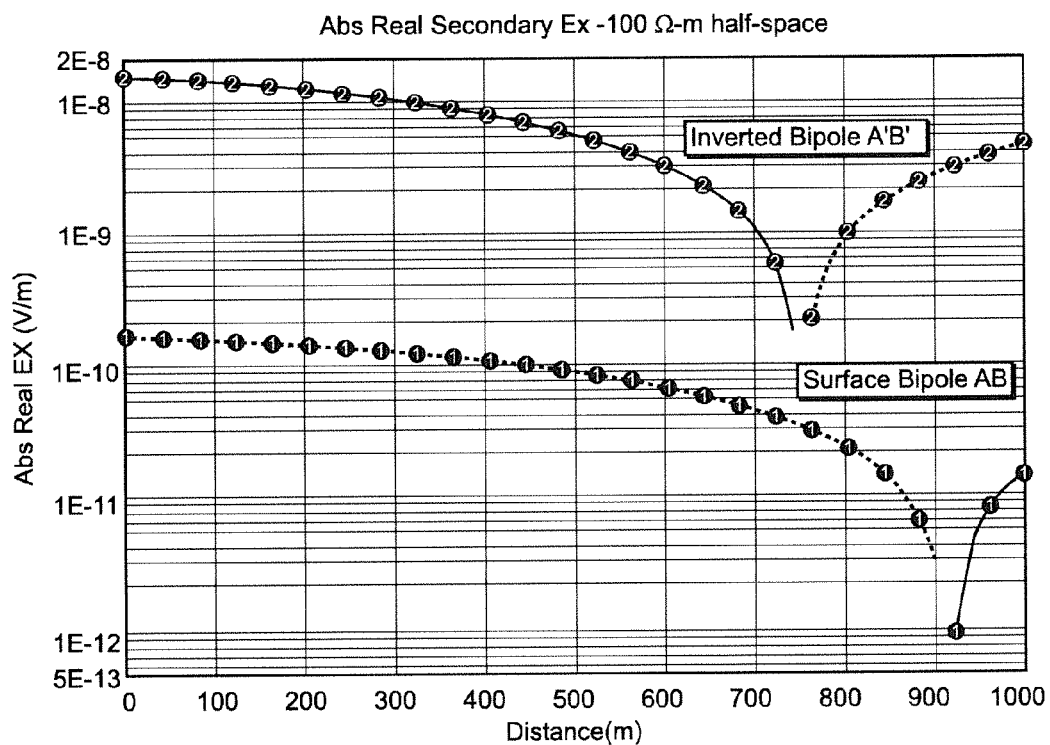
FIG. 2B is a graphical logarithmic plot of surface anomalous fields caused by a deep zone of anomalous resistivity vs. distance from a well.

As will become fully apparent below, the invention relies on an insulated casing to play the role of the insulated current cable conducting current to the downhole electrode, B' of FIG. 1. More specifically, with reference to FIG. 3, a well 100 is depicted including a surface casing 102, an intermediate casing 104 and an innermost or production casing 106. Depending on the depth and purpose of well 100, there may be one or more intermediate casings 104 (herein collectively referred to as the intermediate casing). The depth of surface casing 102 is limited in the figure as the surface casing 102 would typically extend to just below the near surface, unconsolidated sediments or zones of surface ground water. As just shown on the left portion of surface casing 102, cement would be pumped into the annulus between the surface casing 102 and the surrounding ground. The depth to which surface casing 102 extends down into the ground will vary from well to well and generally depends on the near surface ground. In typical oil wells, outer or surface casing 102 would extend down anywhere from 10 feet to a hundred feet or so. Within surface casing 102, intermediate casing 104 extends a distance usually in the range of up to half the final depth of well 100. The space between the lower part (not separately labeled) of each successive casing and the next is filled with cement 108, as illustrated on the left portion of FIG. 3. In this arrangement, the intermediate casing 104 serves to keep the upper reaches of well 100 relatively open to facilitate easy entrance and withdrawal of a drill bit (not shown) needed for extending production casing 106 to a depth of the target zone.

The innermost or production casing 106 can serves to inject fluids into a production zone or extract fluids from that same zone. As detailed below, at least part of production casing 106 is coated with a corrosion resistant or prevention layer 112 which, by reason of its corrosion prevention properties, is an electrical insulator. This corrosion prevention coating 112 thus prevents current from passing or dissipating from casing 106 to the surroundings (note some leakage could occur but it is minimal). In the embodiments of this invention, corrosion prevention coating 112 thus permits the transmission of an electric current from the surface to the end of production casing 106. In the illustrated embodiment, the end of production casing 106 is represented by last segment 110 which is bare metal or a metal that is electrically insulated. Typically, production casing 106 will extend a significant distance into the ground from a well head 128 at the surface, oftentimes going down anywhere from two thousand to fifteen thousand or more feet.

It is common practice in the drilling industry to use a production casing coated with a tough corrosion resistant, insulating layer to prevent casing corrosion. Utilizing a corrosion prevention layer which is also an electrical insulator, i.e., a coating which is electrically resistive, has until now not been of interest in installing casing for conventional applications. To achieve the goal of using the casing for the transmission of current to lower end 110 of the production casing 106 in accordance with the invention, it is necessary to specify the coating for production casing 106 and to further specify that the lowest segment or segments 110 be left uncoated or otherwise not insulated electrically so that they act as a bare metal electrode.

Various different coating options are available, with the pipe coating options including, but not limited to, tape, tar, epoxy and polyurethane coatings. One available corrosion preventing layer includes a coating material supplied by Bond-Coat Inc. of Odessa Tex., USA, www.bondcoat.com. More specifically, this company currently produces an overall coating which can be used on a casing or tubing that consists of a first coat of epoxy resin, a second coat of ground flint aggregate and then a top coat of more resin. The coating thickness is 40-50 mils and exhibits a temperature resistance to 200 F. The resin and ground flint are both electrical insulators. Another source is Tenaris Global Services Corp. of Houston Tex., USA, which at http://www.tenaris.com/en/Products/OffshoreLinePipe/Coating/External-Anticorrosion.aspx discusses various anticorrosion coatings, usually applied to pipelines, either for land or sub-sea applications. These coatings are of two types, either epoxy or epoxy with a bonding transition layer and an overlay of extruded polythene or polypropylene. A three layer coating is said to have "high dielectric resistance". By way of a further example, Liberty Coatings of Morrisville, Pa., USA, www.libertycoating.com, produces two-layer coatings involving butyl rubber overlaid with polyethylene.

In any case, with the insulating coating 112 exhibiting the electrical resistive characteristic, when a current connection is provided at the upper end of the production tubing 106, the current will be transmitted along the entire length of the casing to its exposed end 110 without current, or at least with minimal current, leaking off casing 106 to the surroundings. The electrical current conducted down an inner wall portion of casing 106 is sufficient at end 110 to create the electric fields used in the mapping of the anomalous zones. In a preferred embodiment, the electrical signal is provided to inner casing 106 through an insulated cable 114 which is connected to a current source 116 that is grounded through electrode 117. At its other end, cable 114 is attached to insulated production casing 106 through a connector 118. In one embodiment, connector 118 is a bolt such that cable 14 is bolted directly to the metal casing 106 of well 100.

In an exemplary embodiment, the current source 116 is constituted by a power supply with a voltage range of up to a few hundred volts and capable of supplying 10 to 30 Amps or more of current. The currents are driven at one or multiple frequencies in the range of 0.01 Hz to several thousand Hz. Examples of such power supplies are the GGT-3, GGT-10 and GGT-30 transmitter power supplies from Zonge Engineering and Research, Tucson, Ariz., USA (zonge.com).

Figure 3:
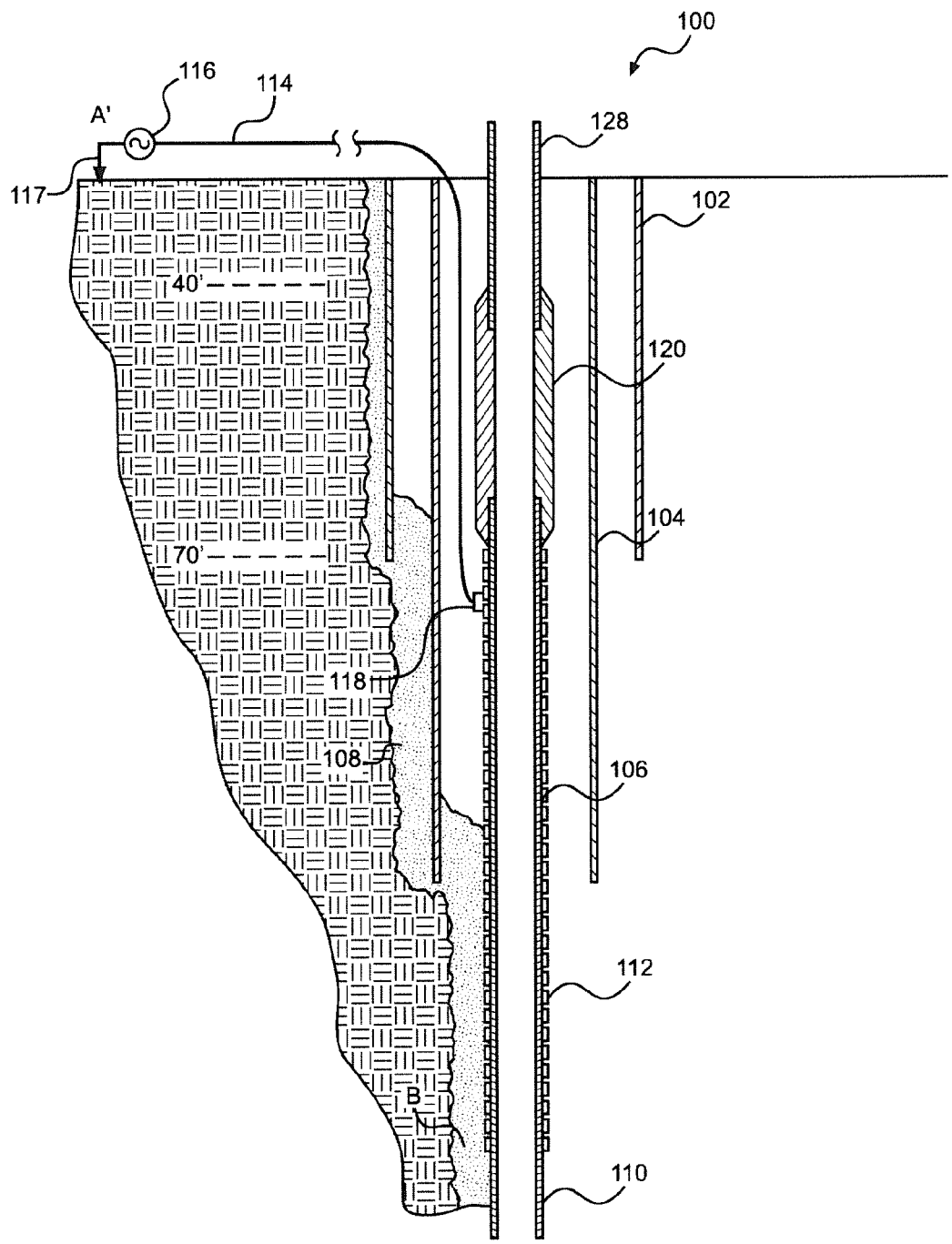
FIG. 3 is a schematic view of a well illustrating an embodiment constructed in accordance with the present invention.

If the cable 114 from current supply source 116 located near the distant grounded electrode 117 were simply connected to the metallic casing at the well head 128, it would then also be connected to the surface equipment which holds the casing in place and which connects production casing 106 to the surface valves and piping required to convey the fluids produced or injected to or from the well 100. To avoid this problem, the insulated current supply cable 114 is connected to the inner portion of insulated, production casing 106 below a casing coupler segment 120 that is electrically non-conducting, thus electrically isolating top casing segment 128 (which may be uncoated or otherwise not insulated) as illustrated in FIG. 3. In one embodiment of the invention, coupler segment 120 comprises a commercially available section of fiberglass casing. However, other coupler materials can be employed, including, but not limited to, non-conductive high strength materials such as Kevlar® fabric impregnated with high strength resins such as epoxy. By way of example, coupler segment has a length of approximately 30-40 feet.

In this embodiment, current provided by source 116 can safely be carried to an inner portion of coated inner production casing 106 below, typically located at shallow depth, about 40-50 feet, while remaining fully, or at least substantially entirely, insulated from the surface equipment, valves, piping etc. by the insulative segment 120. With this arrangement, even with conducting fluid filling innermost production casing 106, negligible current will flow back up to an upper metallic segment at well head 128. At this point, it should be noted that various arrangements could be employed to establish the desired electrical connection between the power source and the inner portion of the second or intermediate segment of production casing 106. In fact, it is even possible to utilize existing well structure, such as a push rod, for this purpose.

Certainly, if insulative coupler segment 120 must support the weight of a heavy well, such as a steel cased well, from the near surface to full well depth, insulated coupler segment 120 may be customized. For instance, as detailed in FIG. 4, insulative coupler 120 may have a thickened fiberglass body, and incorporate an inner threaded steel ring 122 which threads coupler 120 to the end of casing segment 106'. In the illustrated embodiment, female threads 123 of ring 122 are dimensioned to mate with male threads 124 of casing 106'. Of course, the arrangement of the threads could be reversed and other known mechanical couplings could be employed.

Figure 4:
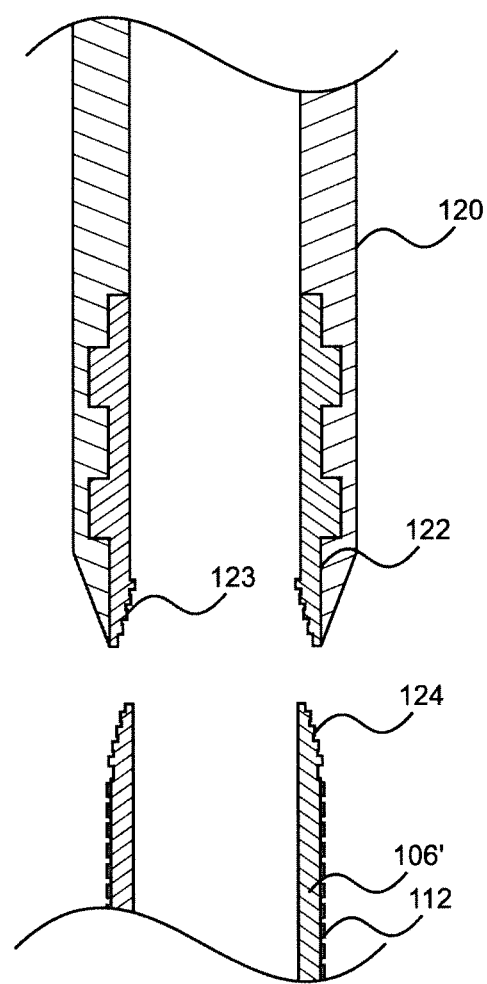
FIG. 4 is a detailed view of an insulating coupler illustrated in FIG. 3.

At this point, it should also be recognized that the present invention can be employed in connection with both a new well and in retrofitting an existing well. In the case of a new well, it will be appreciated that both a coated intermediate production casing and an uncoated bottom end section would be specified, along with the inclusion of the insulative coupler 120 of the invention, such as illustrated in FIGS. 3 and 4. On the other hand, for use with existing, uncoated steel cased wells, another approach is required for delivery of a current to the bottom of the well. In this additional embodiment, a smaller diameter, production casing (or tubing) coated with an electrically insulating material can be lowered into the existing well, with the bottom end segment of the tubing left uncoated. The upper coated end would be similarly attached to an insulative coupler like coupler 120 illustrated at FIG. 4. Therefore, this embodiment includes corresponding first, second and third interconnected segments, and the current is again supplied to the second or intermediate segment for transmission to the third segment at the bottom section of the well and into nearby geological zones adjacent the well, while being prevented from dissipating to around the well along the second segment by the outer electrically resistive coating.

Notably, in this scenario, the bare tubing electrode may be close to, or touching the uninsulated production casing. Should the exposed end section make contact with or short to the existing, uncoated metal casing, charge will leak off as well, specifically exponentially in the direction moving upwardly along the length of the production casing. However, such leakage will dissipate to near zero within a few hundred meters of the casing bottom, thus creating a more distributive, rather than point, type of source. On this point, reference is made to Schenkel and Morrison (Schenkel, C. J. and Morrison, H. F., 1990, Effects of well casing on potential field measurements using downhole current sources: Geophys. Prosp., 38, no. 6, 663-686, and Schenkel, C. J. and Morrison, H. F., 1994, Electrical resistivity measurement through metal casing: Geophysics, 59, no. 7, 1072-1082), where the authors have shown that, although current does flow axially along the casing, current also leaks off radially into the surrounding conducting ground so the casing acts to distribute current flowing into the ground over a finite length of the casing at the bottom of the well. Far from causing a problem, this spreading of the deep current source can actually increase the secondary fields from a nearby zone of anomalous resistivity.

In any case, based on the above, the system and method of the invention provides for transmitting an electric current from a bottom section of a well utilizing a well conduit, such as a well casing or a tube inserted into a well casing, including a first segment proximate a well head, a second segment including an inner portion which is electrically conductive and an outer portion which is electrically resistive (i.e., substantially entirely or at least mostly insulated electrically), and a third segment which is located at or near the bottom section of the well and is electrically conductive. A power source provides the electric current through an electrical connection to the inner portion of the second segment for transmitting the electric current from the power source to the second segment, through the second segment to the third segment which establishes a downhole electrode. From the third segment, the electric current is transmitted into nearby geological zones adjacent the well, particularly for mapping purposes.

Although described with reference to particular embodiments of the invention, it should be understood that the foregoing detailed description of the invention is provided for purposes of illustration and is not intended to be exhaustive or to limit the invention to the embodiments disclosed. Therefore, additional embodiments of the invention can be employed without departing from the spirit of the invention. For instance, very often, producing or injecting fluids from or to the zone of the bottom of the well is carried out by means of a small continuous tube which is inserted in the well and has a diameter smaller than the inner diameter of the production casing. This tube can be inserted at any time after the well is completed. In further accordance with the invention, this insulated production tubing (not shown) can actually be used to convey current to the bottom of the well. Like the insulated inner production casing, this tube can be coated or otherwise treated with an insulating layer and, by leaving a section uncoated or otherwise not insulated at the bottom, the tube can now play the role of the desired insulated cable and electrode. An insulating section of the tubing, similar to that shown in FIG. 3 for the inner casing, would likewise need to be employed. In any case, it should be readily apparent that the invention can be applied to vertical wells, angled wells, horizontal wells, or any combination thereof. Also, although described with reference to a production well, the invention can be employed for use other types of wells including, by not limited to, pilot wells, observation wells, and wells dedicated to injecting fluids into a production zone.

The invention claimed is:

1. A system for transmitting an electric current from a bottom section of a well comprising:
   a well conduit including a first segment proximate a well head, a second segment including an inner portion which is electrically conductive and an outer portion which is electrically resistive, and a third segment which is located at or near the bottom section of the well and is electrically conductive;
   a power source for providing the electric current;
   an electrical connection between the power source and the inner portion of the second segment for transmitting the electric current from the power source to the second segment, through the second segment to the third segment, and into nearby geological zones from the third segment; and
   surface sensors located at the Earth's surface configured to sense changes in electric fields generated utilizing the third segment as a downhole electrode, with the changes resulting from a nature of materials in a vicinity of the well, and wherein the system is configured to detect or delineate subsurface features based on the changes.

2. The system according to claim 1, further comprising: an insulative coupler interposed between said first segment and said second segment, said insulative coupler being formed from a non-conductive material, wherein the first segment is electrically isolated from the electric current by the insulative coupler.

3. The system according to claim 2, wherein the electrical connection is made through an electrically insulated cable connected to the second segment proximate the insulative coupler.

4. The system according to claim 3, wherein the electrical connection to the second segment is made directly adjacent said insulative coupler.

5. The system according to claim 3, wherein the outer portion of the second segment is treated to be electrically resistive in order to limit dissipation of the electric current to around the well along the second segment.

6. The system according to claim 5, wherein the outer portion is treated to include an electrically resistive coating.

7. The system according to claim 6, wherein the outer electrically resistive coating is constituted by a corrosion resistive material.

8. The system according to claim 7, wherein the outer electrically resistive coating includes a polymeric resin.

9. The system according to claim 8, wherein the polymeric resin comprises an epoxy resin.

10. The system according to claim 2, wherein the non-conductive material of said insulative coupler includes fiberglass.

11. The system according to claim 2, wherein the non-conductive material of said insulative coupler includes a resin impregnated Kevlar.

12. The system according to claim 2, wherein the insulative coupler includes an inner threaded ring threadably attached to one of the second segment or the third segment.

13. The system according to claim 12, wherein the inner threaded ring is made of steel.

14. The system according to claim 1, wherein each of the first, second and third segments constitute portions of a well casing.

15. The system according to claim 14, wherein the outer portion of the second segment is treated to be electrically resistive in order to limit dissipation of the electric current to around the well along the second segment.

16. The system according to claim 1, wherein each of the first, second and third segments constitute portions of a tubing inserted into a well casing.

17. A method for transmitting an electric current from a bottom section of a well comprising:

connecting, below a first, upper segment of a well conduit, a current source to an electrically conductive inner portion of a second, lower segment of the well conduit, with the second segment also including an outer portion which is electrically resistive;

providing electric current from the current source to the inner portion of the second segment such that the electric current travels from the current source through the second segment to an electrically conductive bottom segment of said well conduit;

transmitting the electric current from the bottom segment into nearby geological zones;

sensing changes in electric fields generated utilizing the bottom segment as a downhole electrode, with the changes resulting from a nature of materials in a vicinity of the well, at the Earth's surface by surface sensors; and detecting or delineating subsurface features based on the changes.

18. The method of claim 17, further comprising: interconnecting the first segment to the second segment with an insulative coupler made from a non-conductive material, wherein the first segment is electrically isolated from the electric current by the insulative coupler.

19. The method of claim 18, further comprising: providing the electric current to the inner portion of the second segment directly adjacent the insulative coupler.

20. The method of claim 17, further comprising: treating the outer portion of the second segment to be electrically resistive.

21. The method of claim 20, wherein treating the outer portion includes coating the outer portion of the second segment with an electrically resistive material to limit dissipation of the electric current to around the well along the second segment.

22. The method of claim 21, wherein coating with the electrically resistive material also makes the outer portion of the second segment corrosion resistant.

23. The method of claim 17, wherein the well conduit is a production casing.

24. The method of claim 17, wherein the well conduit is a tubing inserted into a well casing.

* * * * *